US009884416B2

(12) United States Patent
Chellew et al.

(10) Patent No.: US 9,884,416 B2
(45) Date of Patent: *Feb. 6, 2018

(54) DEVICES INCLUDING POWER TOOLS WITH NON-BINDING LINEAR SLIDES AND ASSOCIATED METHODS

(75) Inventors: Justin Terrance Chellew, Lebanon, NJ (US); Timothy Richard Cooper, Titusville, NJ (US)

(73) Assignee: Ingersoll-Rand Company, Davidson, NC (US)

( * ) Notice: Subject to any disclaimer, the term of this patent is extended or adjusted under 35 U.S.C. 154(b) by 651 days.

This patent is subject to a terminal disclaimer.

(21) Appl. No.: 13/564,026

(22) Filed: Aug. 1, 2012

(65) Prior Publication Data

US 2013/0031762 A1 Feb. 7, 2013

Related U.S. Application Data

(60) Provisional application No. 61/513,722, filed on Aug. 1, 2011.

(51) Int. Cl.
*B25F 5/02* (2006.01)
*H01M 2/10* (2006.01)
*B25F 5/00* (2006.01)

(52) U.S. Cl.
CPC .................. *B25F 5/02* (2013.01); *B25F 5/00* (2013.01); *H01M 2/1022* (2013.01); *H01M 2/1055* (2013.01); *Y10T 29/49822* (2015.01)

(58) Field of Classification Search
CPC .. H01M 2/1022; H01M 2/105–2/1066; H01M 2/1055; Y10T 403/32229; Y10T 29/49822; B25F 5/02; B25F 5/00
See application file for complete search history.

(56) References Cited

U.S. PATENT DOCUMENTS 2,501,497 A 3/1950 Clark et al.
2,658,972 A 11/1953 Brown
(Continued)

FOREIGN PATENT DOCUMENTS

CN 1126003 A 7/1996
DE 19933015 A1 5/2000
(Continued)

OTHER PUBLICATIONS

International Search Report and Written Opinion for corresponding PCT/US2012/049161, dated Feb. 19, 2013.
(Continued)

*Primary Examiner* — Nicholas P D'Aniello
*Assistant Examiner* — Philip A Stuckey
(74) *Attorney, Agent, or Firm* — Sunstone IP

(57) ABSTRACT

Devices with non-binding linear slides include: (a) a device body and first and second spaced apart linear rails held in the device body; (b) first and second spaced apart (rail) pathways held in cooperating alignment with the rails in the body, a respective one engaged with a respective one of the first and second linear rails that define spaced apart contact points; and (c) a translating actuation (e.g., input) member held by the body in communication with the rails. The actuation (e.g., input) member has a configuration that can generate off-center loads associated with forces applied at different positions of the actuation (e.g., input) member. Only one pathway and rail pair guides linear movement for the first and second force positions to thereby inhibit frictional binding.

15 Claims, 13 Drawing Sheets

(56) References Cited

U.S. PATENT DOCUMENTS

| | | | |
|---|---|---|---|
| 3,366,756 | A | 1/1968 | Watson |
| 3,873,078 | A | 3/1975 | Wolf |
| 3,999,110 | A | 12/1976 | Ramstrom et al. |
| 4,118,611 | A | 10/1978 | Harris |
| 4,433,224 | A | 2/1984 | Kitchen |
| 4,578,628 | A | 3/1986 | Siwiak |
| 4,591,934 | A | 5/1986 | Sims, Jr. |
| 4,968,168 | A | 11/1990 | Chern |
| 4,990,731 | A | 2/1991 | Wu et al. |
| 5,010,219 | A | 4/1991 | Kato |
| 5,012,055 | A | 4/1991 | Matsui |
| 5,213,913 | A | 5/1993 | Anthony, III et al. |
| 5,268,545 | A | 12/1993 | Bruner |
| 5,298,545 | A | 3/1994 | Razvan et al. |
| 5,340,955 | A | 8/1994 | Calvillo et al. |
| 5,589,288 | A | 12/1996 | Coulson et al. |
| 5,681,667 | A | 10/1997 | Bunyea et al. |
| 5,856,038 | A | 1/1999 | Mason |
| 6,126,670 | A | 10/2000 | Walker et al. |
| 6,168,881 | B1 | 1/2001 | Fischer et al. |
| 6,340,261 | B1 | 1/2002 | Furukawa |
| 6,435,751 | B1 | 8/2002 | Ono et al. |
| 6,500,581 | B2 | 12/2002 | White et al. |
| 6,523,442 | B2 | 2/2003 | Lehnert et al. |
| 6,656,626 | B1 | 12/2003 | Mooty et al. |
| 6,840,335 | B1 | 1/2005 | Wu |
| 7,160,132 | B2 | 1/2007 | Phillips et al. |
| 7,243,734 | B2 | 7/2007 | Shuming |
| 7,619,387 | B2 | 11/2009 | Amend et al. |
| 7,816,888 | B2 | 10/2010 | Rejman et al. |
| 7,940,025 | B2 | 5/2011 | Duesselberg |
| 2004/0192106 | A1 | 9/2004 | Britz |
| 2004/0242043 | A1* | 12/2004 | Buck et al. ............... 439/160 |
| 2005/0130034 | A1* | 6/2005 | Buck et al. ............... 429/160 |
| 2006/0055370 | A1 | 3/2006 | Dusselbert |
| 2006/0091858 | A1* | 5/2006 | Johnson et al. ............. 320/128 |
| 2006/0119318 | A1* | 6/2006 | Serdynski et al. ............ 320/114 |
| 2007/0175176 | A1 | 8/2007 | Lane |
| 2007/0229027 | A1 | 10/2007 | Roehm et al. |
| 2007/0240892 | A1 | 10/2007 | Brotto et al. |
| 2008/0113262 | A1 | 5/2008 | Phillips et al. |
| 2008/0207026 | A1 | 8/2008 | Meyer et al. |
| 2010/0129701 | A1* | 5/2010 | Murayama et al. ............ 429/97 |
| 2010/0221589 | A1 | 9/2010 | Friedli et al. |

FOREIGN PATENT DOCUMENTS

| | | |
|---|---|---|
| EP | 1683608 A1 | 9/2004 |
| EP | 1481769 A1 | 12/2004 |
| EP | 2189251 A1 | 5/2010 |
| GB | 2417978 A | 3/2006 |
| GB | 2418057 A | 3/2006 |
| JP | 2009-297802 | 12/2009 |
| WO | 2008035811 A1 | 3/2008 |

OTHER PUBLICATIONS

International Preliminary Report on Patentability dated Feb. 4, 2014 from International Patent Application No. PCT/US2012/049161 filed Aug. 1, 2012

Office Action dated Feb. 10, 2015 from Chinese Patent Application No. 201280025879.4 filed Aug. 1, 2012.

European Search Report dated Feb. 13, 2015 from European Patent Application No. 12819972.6 filed Aug. 1, 2012.

Office Action dated Mar. 14, 2016 from Chinese Patent Application No. 201280025879.4 filed Aug. 1, 2012.

Office Action dated Sep. 28, 2015 from Chinese Patent Application No. 201280025879.4 filed Aug. 1, 2012.

International Preliminary Report on Patentability dated Feb. 4, 2014 from International Patent Application No. PCT/US2011/046072, filed Aug. 1, 2011.

International Search Report dated May 29, 2012 from International Patent Application No. PCT/US2011/046072, filed Aug. 1, 2011.

European Search Report dated Feb. 25, 2015 from European Patent Applicaton No. 11870463.4, filed Jan. 8, 2011.

Office Action dated Mar. 25, 2015 from Chinese Patent Application No. 201180073917.9, filed Aug. 1, 2011.

Office Action dated Oct. 8, 2015 from Chinese Patent Application No. 201180073917.9, filed Aug. 1, 2011.

Office Action dated Apr. 4, 2016 from U.S. Appl. No. 14/235,480, filed Jan. 28, 2014.

Notice of Allowance dated Sep. 27, 2016 from U.S. Appl. No. 14/235,480, filed Jan. 28, 2014.

Notice of Allowance dated Jan. 20, 2017 from U.S. Appl. No. 14/235,480, filed Jan. 28, 2014.

* cited by examiner

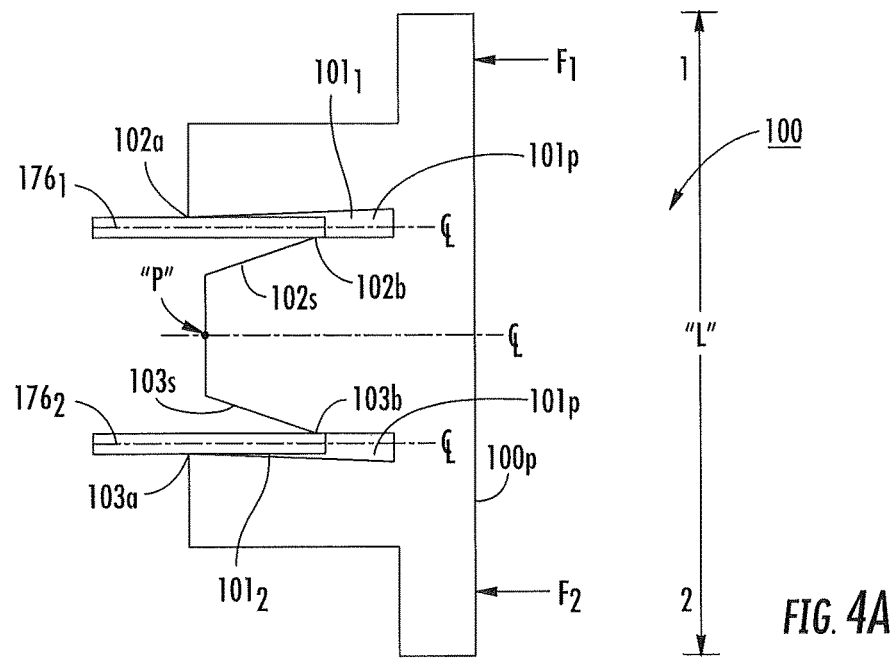
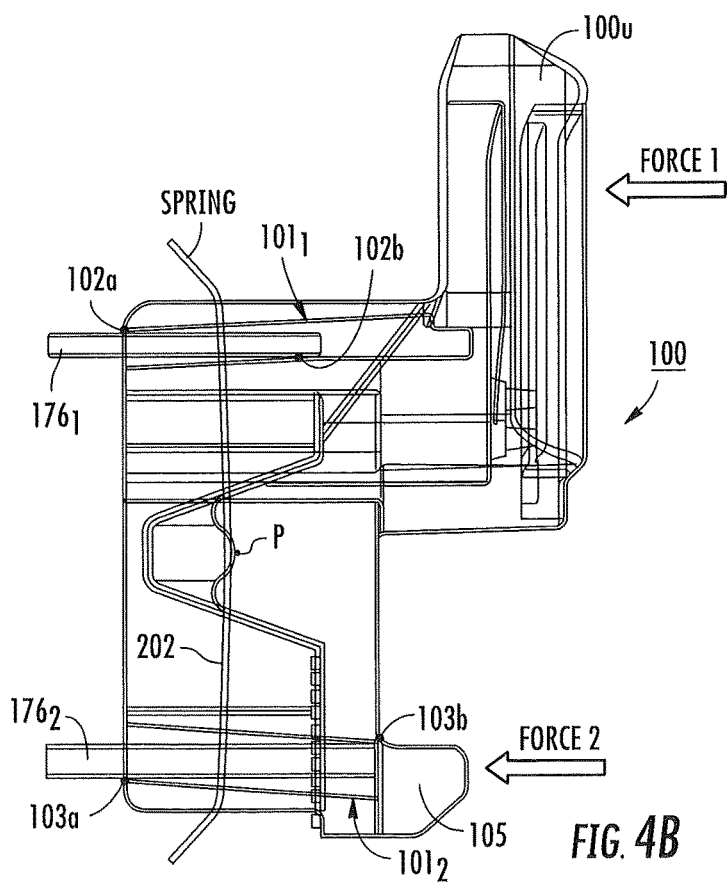
FIG. 4A
FIG. 4B

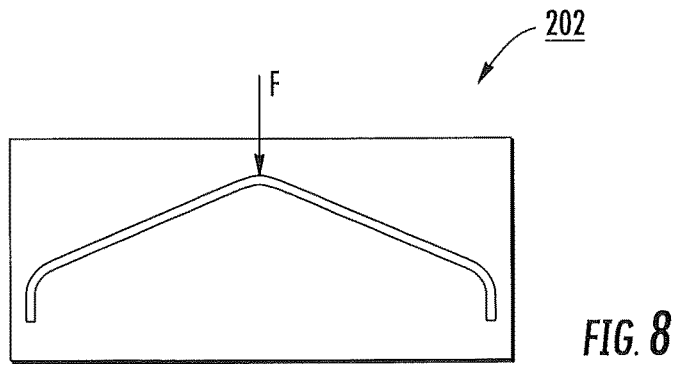
FIG. 8
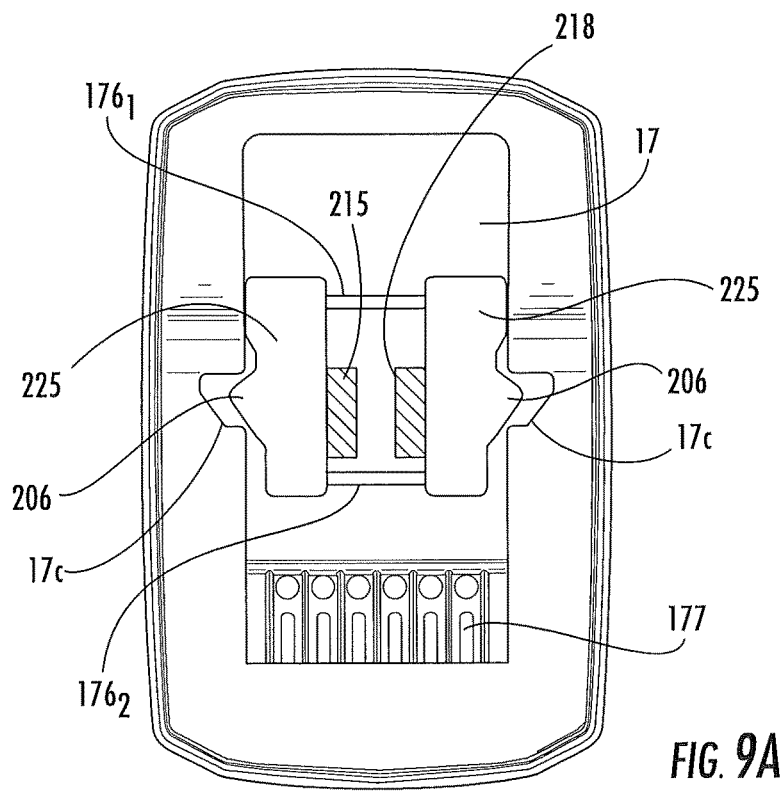
FIG. 9A
FIG. 9B
FIG. 9C

DEVICES INCLUDING POWER TOOLS WITH NON-BINDING LINEAR SLIDES AND ASSOCIATED METHODS

RELATED APPLICATIONS

This application claims the benefit of and priority to U.S. Provisional Application Ser. No. 61/513,722, filed Aug. 1, 2011, the contents of which are hereby incorporated by reference as if recited in full herein.

FIELD OF THE INVENTION

This invention relates to mechanisms for inhibiting binding of moving components due to off-center applied loads and may be particularly suitable for triggers, guide blocks and/or battery latch release buttons such as those used with power tools having releasable battery packs.

BACKGROUND OF THE INVENTION

Various electric devices including cordless electric power tools are well-known. Examples of such tools include, but are not limited to, drills, drill drivers, impact wrenches, grease guns and the like. Such devices can use releasable, typically rechargeable, battery packs or other inputs such as triggers that can be subject to off-center loads that may undesirably cause frictional binding or locking.

SUMMARY OF EMBODIMENTS OF THE INVENTION

Embodiments of the invention are directed to user input members in communication with non-binding linear slides that inhibit binding when exposed to off-center loads.

Embodiments of the invention are directed to devices that include a device body and first and second spaced apart linear rails held in the device body. The device body also include first and second defined pathways, one for each of the first and second linear rails. The defined pathways include first and spaced apart contact points for the respective linear rail. The device body also include a translating actuation (e.g., input) member held by the device body in communication with the rails. The actuation member has a configuration with first and second spaced apart end portions that can generate off-center loads associated with forces applied at different positions of the input member. In response to a force applied against the first end of the input member, contact points of the defined pathway of the first rail, which are adjacent the first end of the actuation member, are closer than contact points of the defined pathway of the second rail to thereby inhibit frictional binding and allow the first rail to provide primary linear movement guidance.

The first and second defined pathways can include first and second spaced apart channels, a respective one of the first and second linear rails engage a respective one of the channels to define a respective channel and rail pair. The channels can include angled wall segments configured so that a force applied at: (i) a first off-center position against the input member causes the first rail to engage the first channel contact points while the second rail has less or no contact with the second channel contact points; and (ii) a second off-center position spaced apart from the first position causes the second rail to engage the second channel contact points while the first rail has less or no contact with the first channel contact points. Only one channel and rail pair guides linear movement for the first and second positions.

The device body can optionally be a rechargeable battery pack housing body. The actuation member can be a battery pack release member that includes or is in communication with a latching member. The first and second rails can be substantially parallel rails.

The device body can be a battery pack housing body that can releasably engage a cordless power tool.

The translating member can be a trigger for a power tool.

The translating actuation member can have a body that defines the first and second pathways. The pathways can reside on opposing sides of a center line of the input member that extends in a direction of travel of the input member.

The rails can extend downwardly from an upper portion of the device body (e.g., a battery pack housing body). The translating member can include a portion that resides under the rails and defines the first and second pathways with the first and second pathways extending upwardly with respective open ends thereof facing upward.

The device body can be a battery pack release member that can include a monolithic unitary primary body with an upper portion and a lower portion. The upper portion can reside outside the battery pack housing body to define a user accessible manually actuatable release member. The lower portion can reside inside the battery pack housing and includes the first and second defined pathways. The primary body can include an upwardly extending latch portion that extends above and is substantially in-line with the second pathway.

The first and second pathways can be upwardly extending channels. The device body (e.g., battery pack housing) can have an upper portion that defines the rails, with the first and second rails laterally extending across an inner portion of the upper portion of the device body.

The first channel can be longer and thinner than the second channel.

The device body can be a battery pack housing and the actuation member can be a battery pack release member with a lower portion held inside the housing and an upper portion being externally accessible for manual actuation by a user. The first off center force position that moves the first rail and channel closer together is associated with a delatch actuation force applied to the battery pack release member by a user and the second off center force position is associated with a latch force applied by the housing in response to contact with a latch member.

The first and second pathways can include rigid first and second sets of pins, each set comprising a first pin on a first side of a centerline of a gap space and a second pin on an opposite side of the gap space centerline spaced apart from the first pin that define the contact points.

Still other embodiments are directed to cordless power tools. The tools include a power tool housing and a battery pack releasably attached to the power tool. The battery pack can include at least one battery pack release member defining an externally accessible user-contact portion for manual delatching of the battery pack from the power tool housing and including a latch member and first and second spaced apart defined guide pathways. The first pathway can be positioned under the externally accessible user-contact portion and the second pathway positioned under the latch member. The batter pack can also include at least first and second linear rails that reside inside the battery pack aligned with the respective first and second defined guide pathways to slidably engage corresponding ones of the first and second rails. The defined guide pathways have first and spaced apart contact points for the respective linear rail. In response to a force applied against the user contact portion, contact points of the defined guide pathway of the first rail are closer than contact points of the defined pathway of the second rail to thereby inhibit frictional binding and allow the first rail to provide primary linear movement guidance.

The first and second defined pathways can include first and second spaced apart channels, a respective one of the first and second linear rails engage a respective one of the channels to define a respective channel and rail pair. The channels can include angled wall segments configured so that a force applied at: (i) a first off-center position against the input member causes the first rail to engage the first channel contact points while the second rail has less contact with the second channel contact points; and (ii) a second off-center position spaced apart from the first position causes the second rail to engage the second channel contact points while the first rail has less contact with the first channel contact points, and wherein only one channel and rail pair guides linear movement for the first and second positions.

The first and second rails can be parallel and extend downwardly and the first and second guide pathways can be substantially parallel and extend upwardly.

The latch member can include an upwardly extending finger that engages a ledge in the power tool housing.

The first and second pathways can be substantially parallel and reside on opposing sides of an interior pivot point of the battery release member.

The at least one battery pack release member can include two members, each comprising a monolithic unitary primary body with an upper portion and a lower portion. The upper portion can reside outside the battery pack housing body to define the user contact portion and the latch member, and the lower portion can reside inside the battery pack housing and including the first and second guide pathways.

The guide pathway contact points can be defined by sets of cooperating rigid pins.

Yet other embodiments are directed to methods of releasing a rechargeable battery pack from a cordless power tool having at least one battery pack release member having a plurality of spaced apart guide pathways that each engage a respective corresponding cooperating linear rail to guide linear movement. The methods include: (a) manually pushing at least one battery pack release member inward to initiate release of the battery pack from the power tool; (b) applying a force to the battery pack member in response to the pushing; and (c) forcing a first linear rail closest to the applied force to travel closer to respective contact points associated with its guide pathway while a second linear rail is spaced apart from respective contact points in its guide pathway, so that the first linear rail guides the linear movement of the battery pack release member thereby guide linear movement and inhibiting frictional locking or binding.

The foregoing and other objects and aspects of the present invention are explained in detail in the specification set forth below.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 4A is a schematic sectional view of a release member (e.g., "button") in communication with linear slides that can inhibit binding according to embodiments of the present invention.

FIG. 4B is an enlarged partial cutaway view of a release member with integrated channels according to embodiments of the present invention.

FIG. 8 illustrates an example of a shaped (to have a self-shape restoring biased stress) unloaded buckle spring according to some embodiments of the present invention.

FIG. 9A is a bottom view of an upper portion of the battery pack with linear slides and another exemplary tactile feedback mechanism.

FIGS. 9B and 9C are schematic illustrations of different magnetic field configurations that may be used for the tactile feedback mechanism of FIG. 9A according to embodiments of the present invention.

DESCRIPTION OF EMBODIMENTS OF THE INVENTION

Figure 1A:
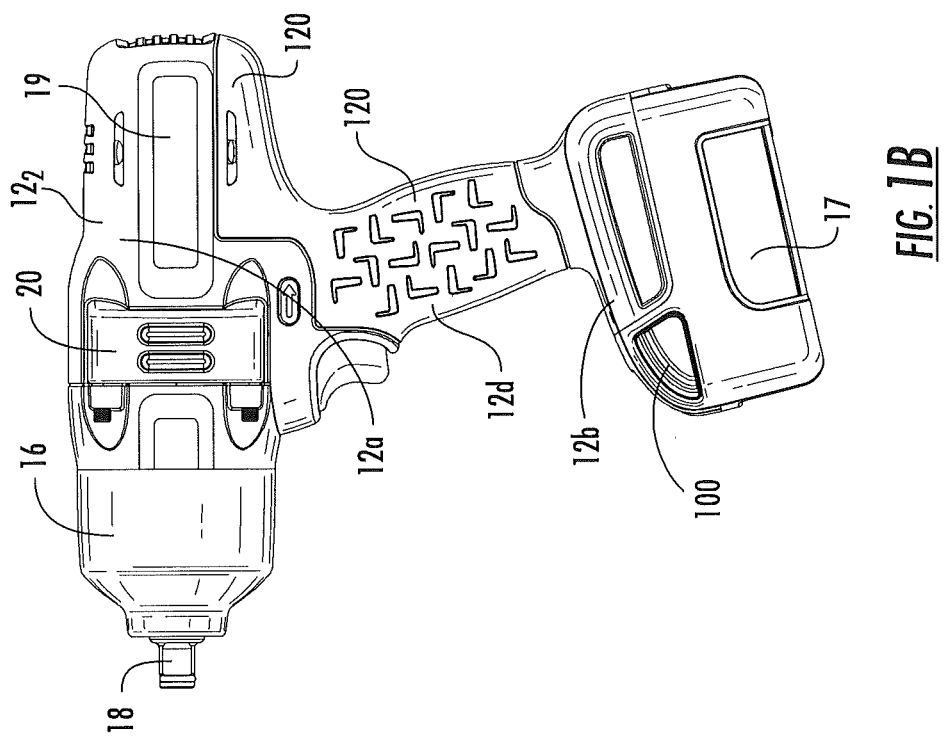
FIG. 1A is a side perspective view of an exemplary cordless power tool according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when a feature, such as a layer, region or substrate, is referred to as being "on" another feature or element, it can be directly on the other feature or element or intervening features and/or elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein.

The term "cordless" power tool refers to power tools that do not require plug-in, hard-wired ("corded") electrical connections to an external power source to operate. Rather, the cordless power tools have electric motors that are powered by on-board batteries, such as rechargeable batteries. A range of batteries may fit a range of cordless tools. In some embodiments, a "universal" battery pack can operate a number of different power tools. Different cordless power tools may have a variety of electrical current demand profiles that operate more efficiently with batteries providing a suitable range of voltages and current capacities. The different cordless (e.g., battery powered) power tools can include, for example, screwdrivers, ratchets, nutrunners, impacts, drills, drill drivers, grease guns and the like. The cordless power tools can have a linear body, a pistol body or an angled forward end. The cordless power tools can releasably engage a battery pack as is known by those of skill in the art.

The term "blind latch" refers to a latch that engages an internal locking surface, feature or member of a housing in a manner that is not visually accessible to a user when the latch is locked to the housing.

Figure 1B:
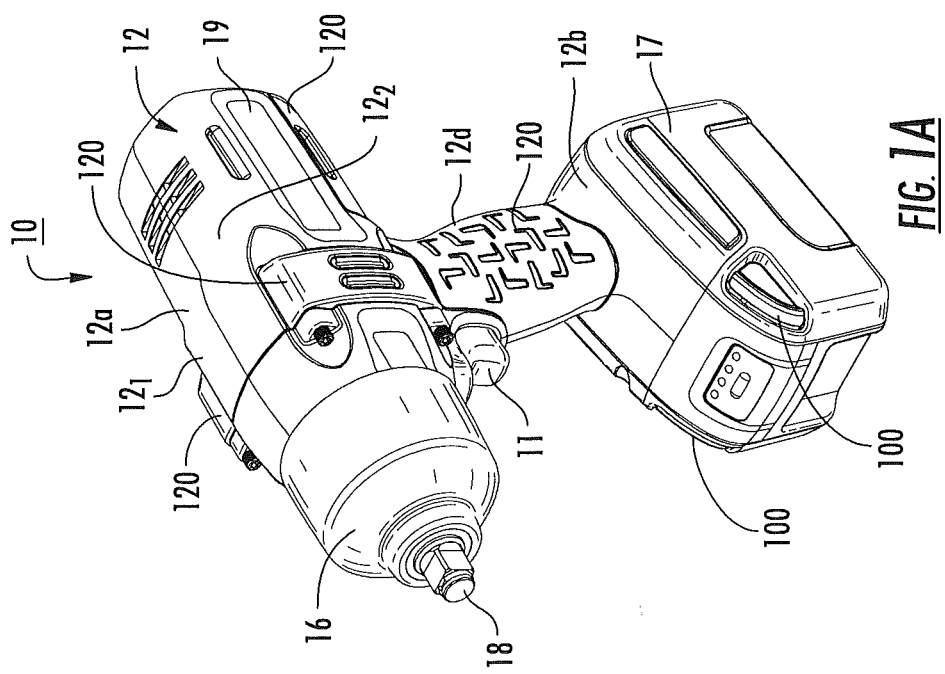
FIG. 1B is a side view of the tool shown in FIG. 1A.

FIGS. 1A and 1B illustrate an example of a type of power tool 10 that includes a housing 12, a gearcase 16 and a tool output shaft 18. As shown in FIGS. 1A, 1B and 2, the housing 12 encases a motor (not depicted) and partially surrounds the gearcase 16. The gearcase 16 can be metallic and encloses an internal drive train 20. In this embodiment, the lower portion of the housing 12 can releasably engage a battery pack 17. The housing 12 can include an external control such as a trigger 11 and a UI (user interface) 19 with a display. However, the tool 10 and/or housing 12 can have other configurations and may enclose the gearcase 16 and/or have other handle configurations. Also, the housing 12 may not include gears or a gearcase 16. Also, for impacts, the housing 12 may include a "hammer case".

In some embodiments, and as shown, the housing can be a "pistol" type housing that can include first and second substantially symmetrical clam shell bodies $12_1$, $12_2$ with an upper substantially axially extending head portion 12a that merges into a downwardly extending hand grip portion 12d.

As is well known to those of skill in the art, the housing 12, which may optionally be formed using shell bodies $12_1$, $12_2$, can comprise a substantially rigid substrate that has sufficient structural strength (and hardness) to be able to support the tool components, with or without reinforcement members. The substantially rigid substrate for each shell body $12_1$, $12_2$ can comprise a single or multi-shot, injection-molded shell body. An example of a suitable moldable composite material is glass-filled nylon. However, other non-metallic materials, typically composite materials that comprise polymeric materials, can be used, particularly those with a hardness or durometer of at least about 90 Shore A.

Still referring to FIGS. 1A and 1B, the outer surface of the housing 12 can optionally include external overmold portions 120 of an elastomeric (e.g., rubber or rubber-like) material, such as a thermoplastic elastomeric material, that can provide a softer tactile grip relative to the rigid substrate material of the housing 12. The external overmold portions 120 may alternatively or additionally provide some shock protection for internal components due to inadvertent drops and the like. Where used, the external overmold portions 120 may all be formed of the same material or some may be formed of different materials with the same or different Shore A durometers. In particular embodiments, the overmold material can have, for example, a Shore A durometer that is between about 40-80, more typically between about 40-60. There are many suitable elastomeric materials as is well known to those of skill in the art.

Figure 2A:
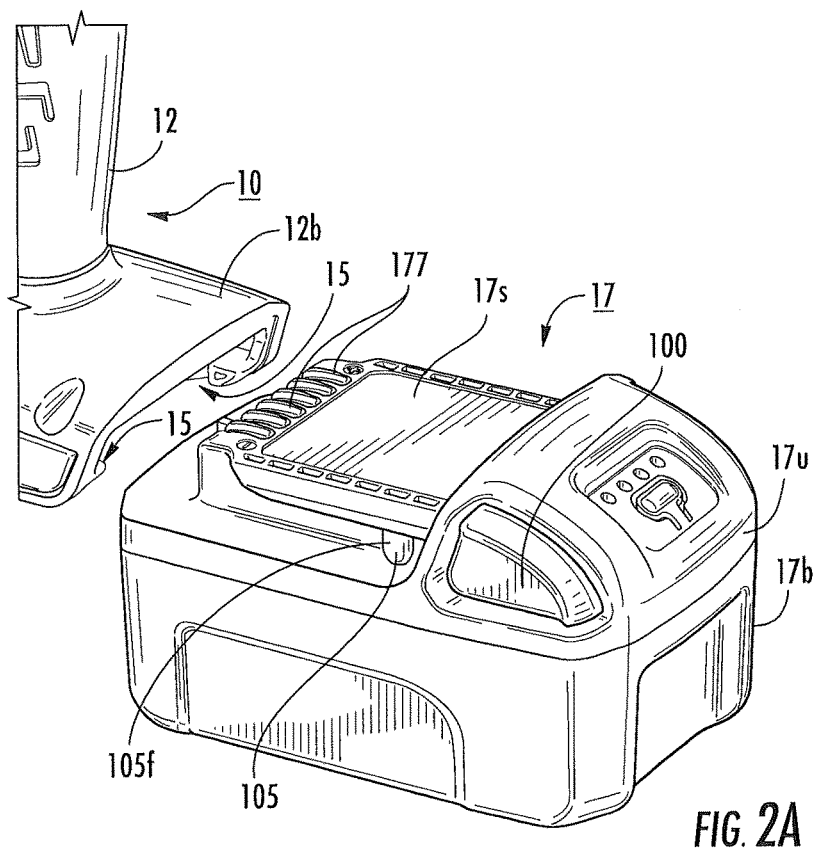
FIG. 2A is an enlarged side perspective view of a battery pack with latches that releasably engage a power tool according to embodiments of the present invention.
Figure 2B:
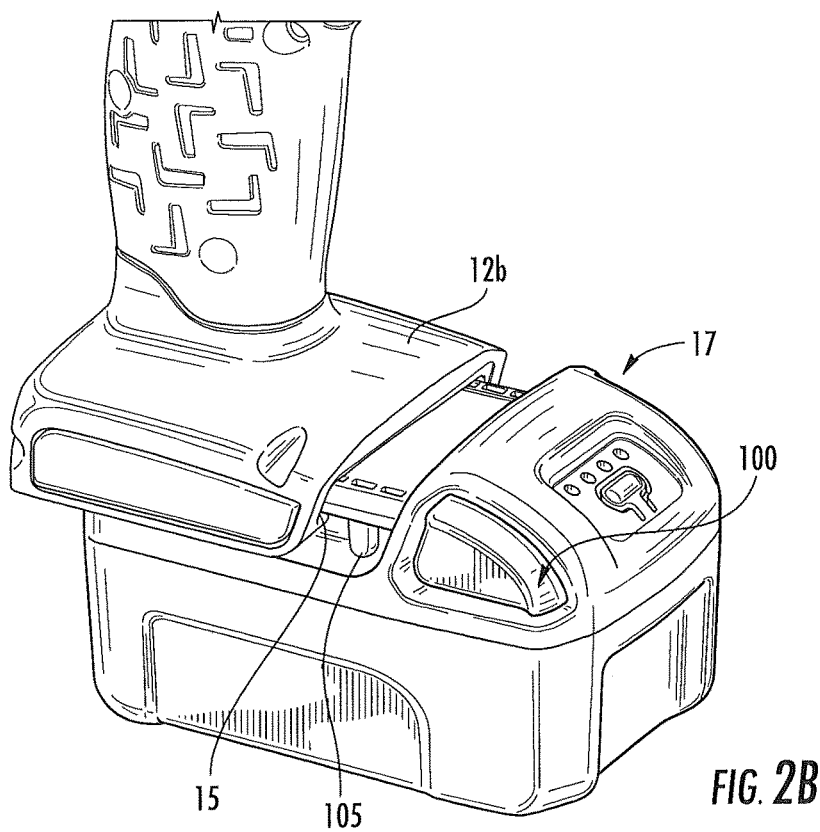
FIG. 2B illustrates the device of FIG. 2A with the power tool housing slidably engaging the battery pack according to embodiments of the present invention.
Figure 2C:
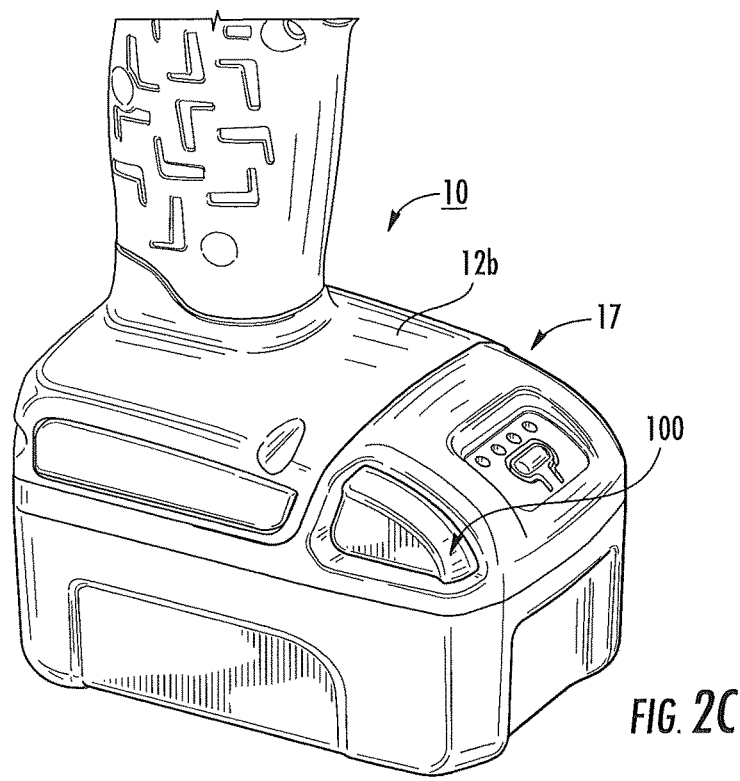
FIG. 2C illustrates the power tool and battery pack of FIG. 2A in a fully seated configuration.
Figure 5A:
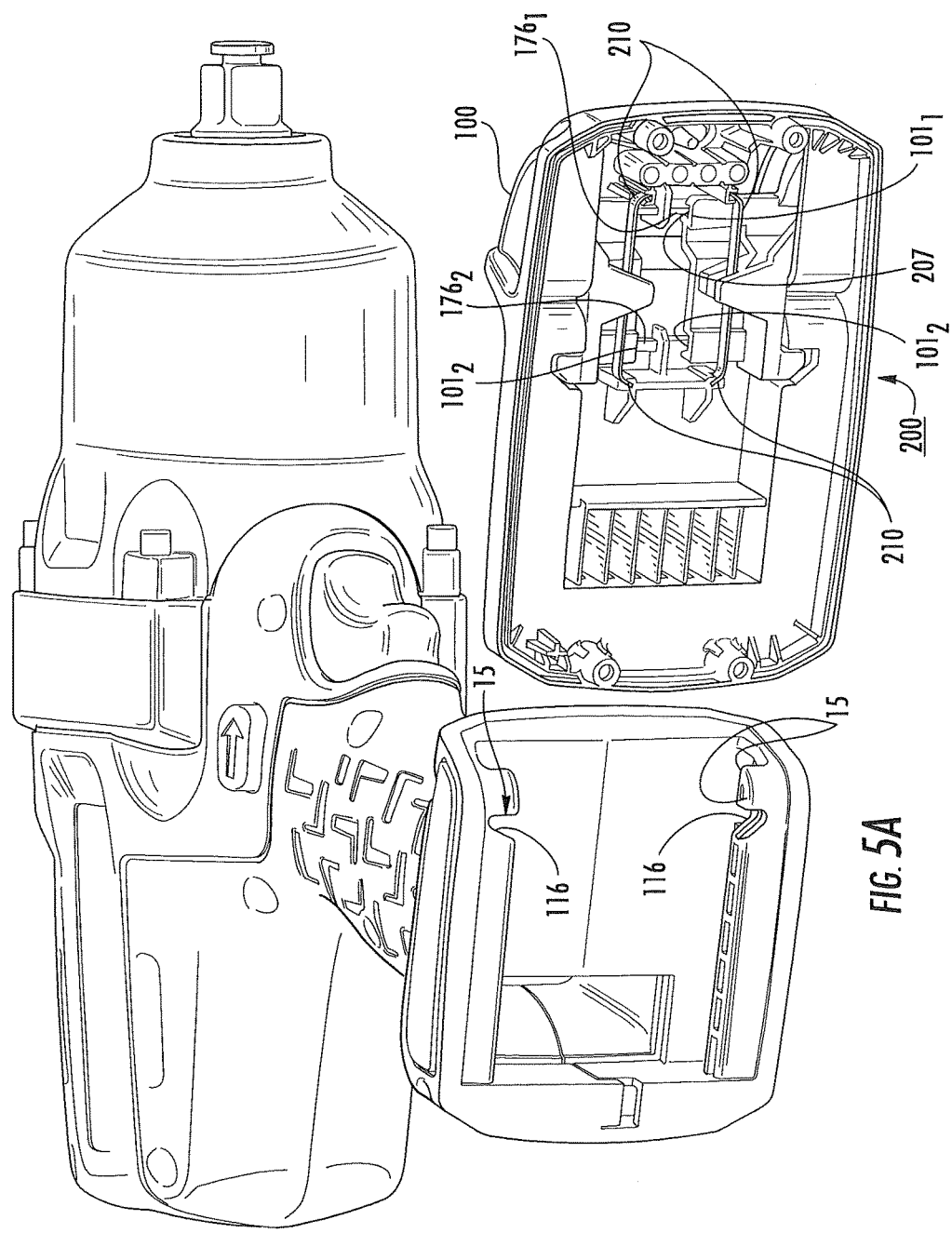
FIGS. 5A-5C are sequential, bottom perspective views of a portion of a battery pack corresponding to FIGS. 2A-2C.

FIGS. 2A-2C illustrate that the battery pack 17 can include at least one latch 105 that releasably engages the power tool housing 12. The battery pack 17 also includes at least one manually (user) depressible release member 100 that translates the at least one latch 105 to allow the detachment of the battery pack 17 from the tool housing 12. The latch 105 can include a downwardly extending finger 105f (FIG. 2A) that slidably engages a slot 116 (FIG. 5A). The slot 116 can be an open slot 116 formed in an inwardly extending substantially horizontal ledge 15 in the base of the tool housing 12b. The slot 116 can have a curvilinear perimeter shape. As shown, each side of the base 12b includes an inwardly extending ledge with a slot 116 oriented so that the opening of a respective slot faces the other across a cavity in the base of the housing 12b. Referring to FIGS. 2A-2C, the latch 105 can extend downwardly under the upper surface 17s. To actuate the release member 100, a user pushes down both release members 100, typically substantially concurrently, which causes the respective latch 105 to move up and/or inward to a prescribed position to allow the battery pack to be disengaged from the power tool (the movement of the latch can be to move it inward toward the center open space away from the respective ledge 15).

The latch and release configurations are not limited to the embodiment shown and can be any suitable configuration. For example, in some embodiments, the battery pack 17 can employ a single release member. In addition, the one or more release members 100 can be configured to translate using an inward application (push) force, rather than a downward force, or even outward or upward force. In yet other embodiments, a user can manually apply a dual application force, e.g., a manual push inward and downward.

In addition, although particularly useful for power tools, the battery packs can be configured for use with other electric devices. Still further, as noted above, the power tool may not employ a gear case (e.g., may not include gears) such as an impact mechanism and thus, the case may be a hammer case or other enclosure type.

Figure 6:
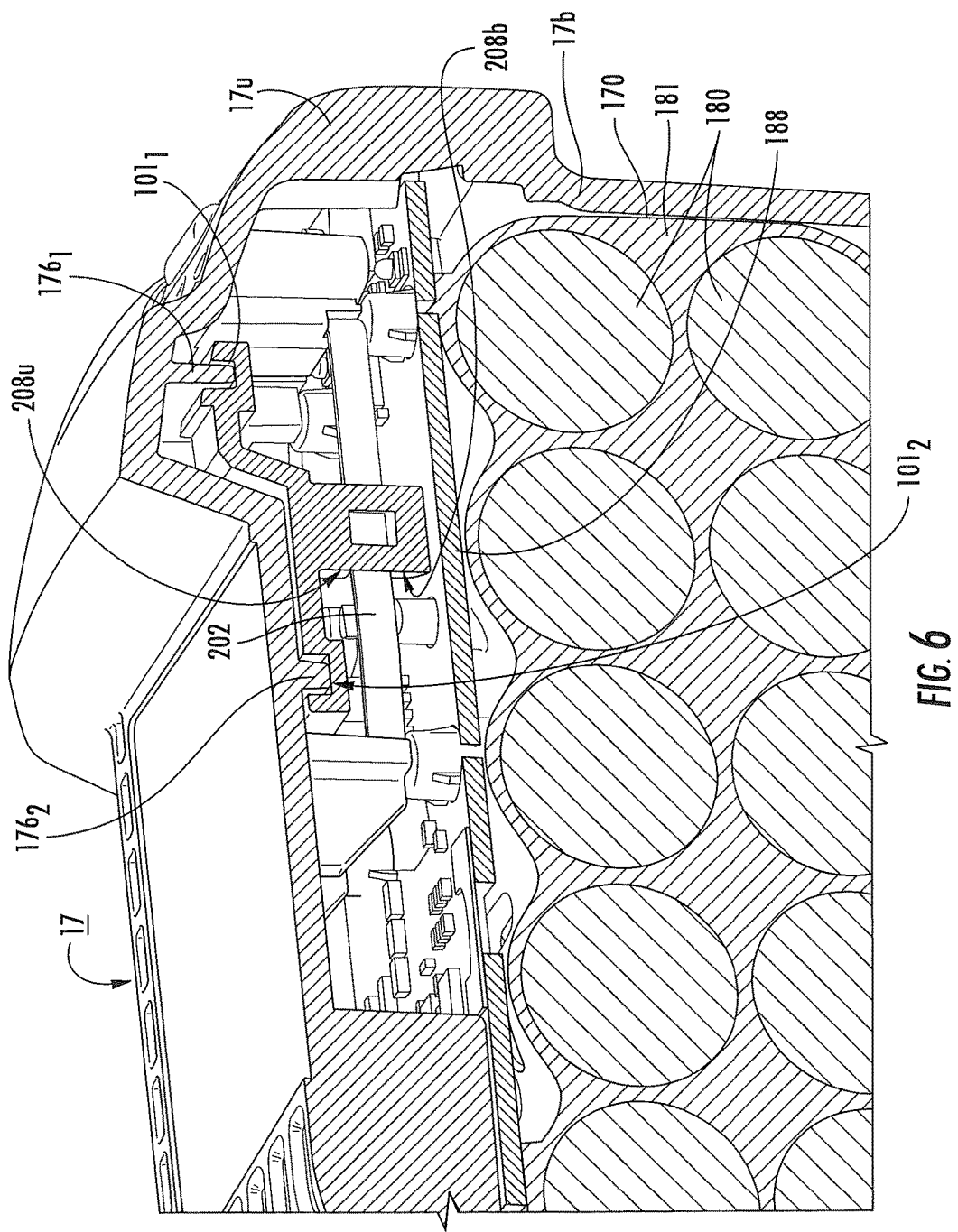
FIG. 6 is a partial cutaway, side perspective view of a battery pack with the release member shown in FIG. 4 according to some embodiments of the present invention.
Figure 7:
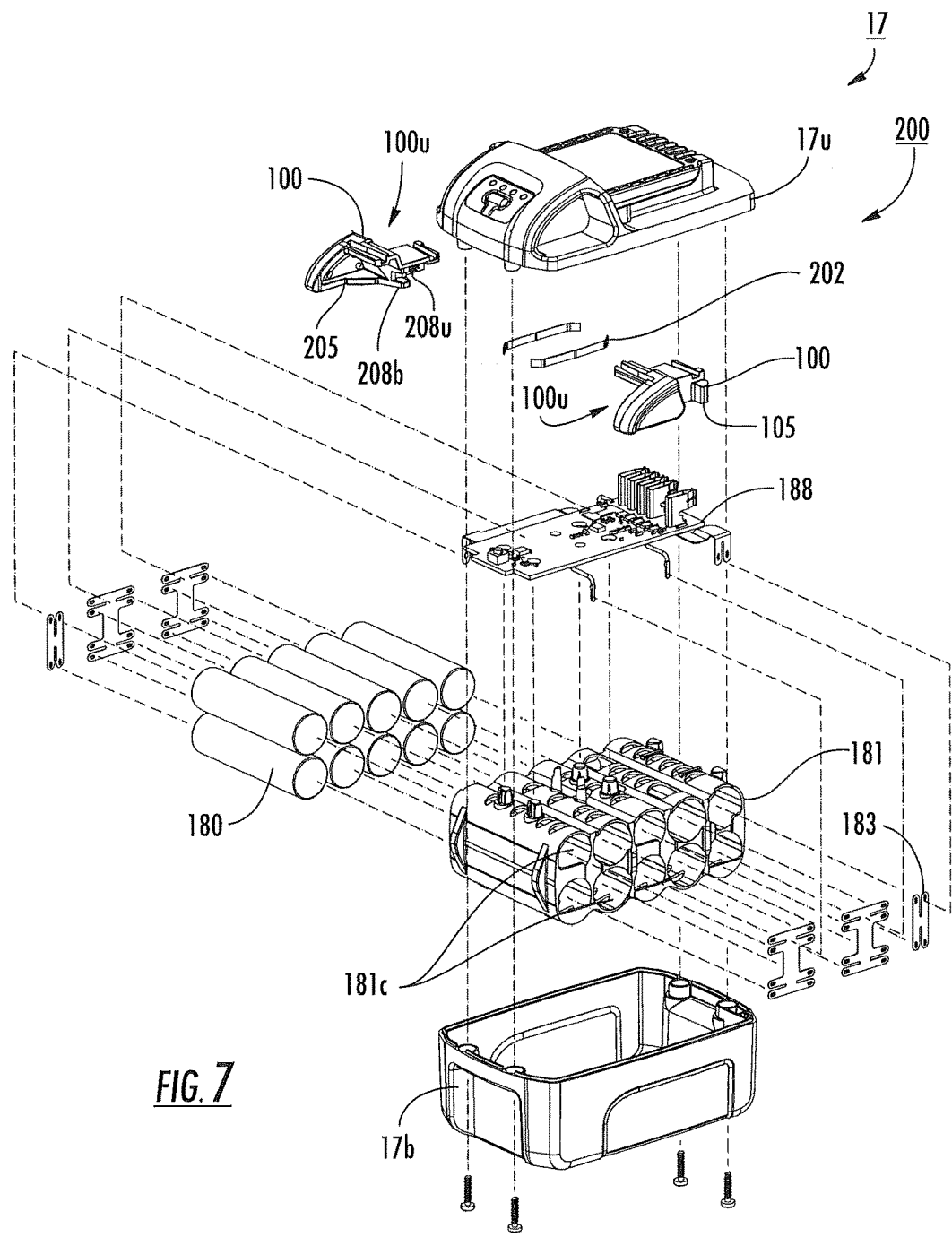
FIG. 7 is an exploded view of an exemplary battery pack with the release members shown in FIGS. 4 and 6 according to some embodiments of the present invention.

As shown in FIGS. 2A-2C, the battery pack 17 can have an upper body 17u and a lower body 17b that define a cavity 170 (FIG. 6) therebetween that holds battery cells 180 (FIGS. 6, 7). The battery pack upper and lower body, 17u, 17b, respectively can releasably or integrally attach to each other to encase battery cells 180 held in a semi-rigid elastomeric carrier 181 (FIG. 6, 7). The battery pack 17 can have an exposed upper surface 17s with electrical contact pads 177 (FIGS. 2A, 9A).

The battery pack 17 includes at least one user-depressible release member 100 in communication with at least one latch 105 that locks the battery pack 17 to the tool body 10, typically at the housing base 12b.

In some embodiments, the battery pack 17 can include a tactile feedback mechanism 200 that decreases the stiffness of the actuation movement and/or force in a manner sufficient to provide a user with a tactile feedback associated with when the release member 100 has been depressed a sufficient amount to disengage the latch 105 from locking position in the housing 12 to indicate to a user that the battery pack 17 can now be easily released from the power tool housing 12. As the latch 105 is typically positioned in a blind location, not readily externally visible by a user when the battery pack 17 is attached to the power tool housing 12, the tactile feedback mechanism 200 is configured to provide a user a tactile feel for when the latch(es) 105 has been retracted far enough to allow for easy removal of the battery pack 17 from the tool 10. In the past, battery packs have used coil or leaf springs by which a user must press the release member with ever increasing force to retract the buttons and latches to disengage the battery from the tool. This can be frustrating to a user because it is difficult for user to know how far or hard they should press before the buttons and latches holding the battery pack are retracted far enough to allow for ease or removal.

Where used, the tactile feedback mechanism 200 can be configured to allow a user to press with increasing force up until a certain trigger point, after which the reaction force of the device (the resistance to the translation or actuation force being applied by the user/operator) changes abruptly, e.g., rapidly decreases or rapidly increases, associated to indicate to the user as to when the latch(es) 105 is in a release position. This sudden, relatively large, change in reaction and/or resistance force provides a tactile feedback to a user that the battery is ready to be easily removed from the power tool. This reflects that the latch 105 is now in a prescribed release position, is disengaged or easily disengageable by the user, so as to be able to (slidably) release the battery pack from the housing.

In some embodiments, the tactile feedback can generate (i) a reduced reaction and/or resistance force to a user that is at least about 10% less, more typically 20-60% less, such as between about 30-45% less, than the initial application force applied by a user to start to release the latch or (ii) an increased reaction and/or resistance force that is between about 30-100% greater than the initial application force applied by a user to start to release the latch. In some embodiments, the tactile feedback can be defined as the tactile ratio which equals ((Fmax−Fmin)/Fmax) (×100), where Fmax is the trip force, and Fmin is the return force.

In some embodiments, the trip force is about 3 lbs, and the return force is about 1.75 lbs, providing about a 42% tactile ratio. Higher tactile ratios, e.g., above 20%, such as about 30%, about 40%, about 45% or even higher may be more readily distinguishable to the user, but a lower tactile ratios, such as about 10% (or maybe even lower) may also be used.

In a preferred embodiment, the tactile feedback mechanism is configured so that the reaction and/or resistance force (Fa) rapidly decreases after the "change" or "trigger" point associated with sufficient displacement travel distance of the at least one release member 100 to allow for the battery pack to be easily released and can generate a "snap" and/or "click" like tactile feel, which may include an associated audible response as an audible indication that the release button has been sufficiently translated along its travel stroke distance.

The battery release member(s) 100 can have a stroke distance between a home and fully deployed position and the actuation force Fa a user needs to apply to the release member to cause displacement changes over this distance. Where used, the tactile feedback mechanism 200 can be configured to generate an abrupt change in resistance and/or reaction force as the release member moves in a delatching direction over its stroke distance, at a prescribed trigger point. The trigger point resides between the home and full stroke distance and corresponds to when the latch has been disengaged sufficiently to allow for easy removal of the battery pack 17 from the device/power tool. The tactile feedback mechanism that communicates with the battery release member 100 generates the abrupt decrease. In some embodiments, the abrupt decrease can be a decrease of between about 0.25 lbs to about 2.5 lbs and any value therebetween, including about 0.5 lbs, about 0.75 lbs, about 1 lb, about 1.25 lbs, about 1.5 lbs, about 1.75 lbs and about 2 lbs. Higher and lower changes in force may also be used.

In some embodiments, the battery pack release member 100 can be configured to inhibit frictional binding or locking.

Figure 3:
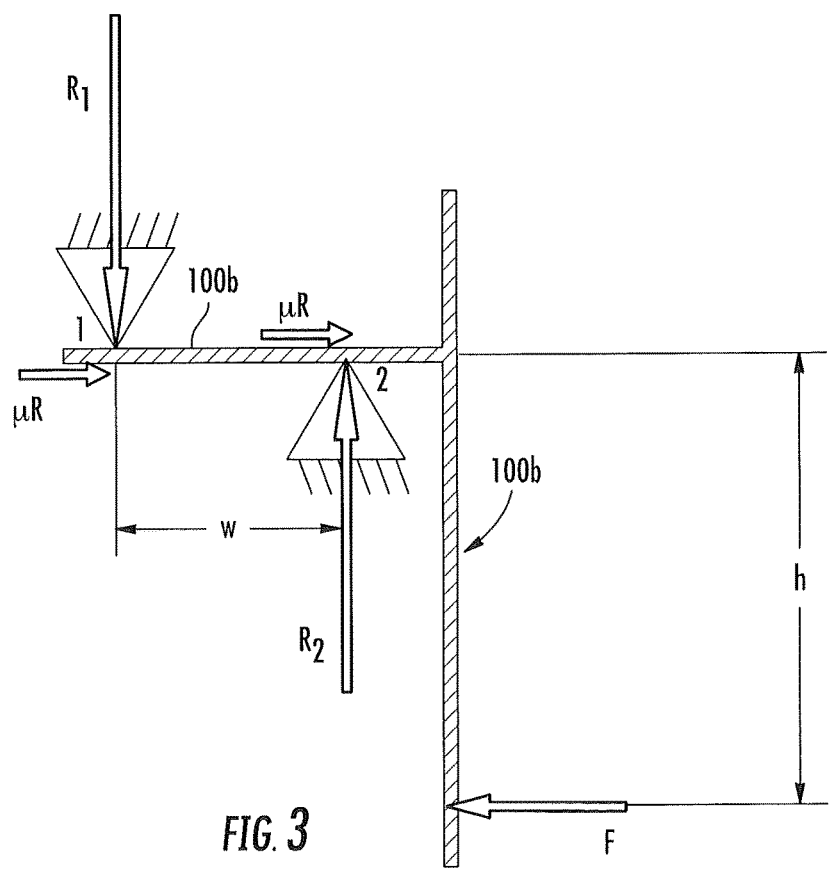
FIG. 3 is a schematic force diagram of friction locking that may occur to bind certain key, guide blocks or other components due to off center loads.

FIG. 3 schematically illustrates a force diagram with a simple example of frictional locking that can occur when moving components are subject to off-center loading (F). In FIG. 3, a single applied force, F, is shown applied to a guide block 100b, such as a push-button release member or other actuation component, at a distance "h" offset from a slide channel. The guide block 100b is represented by the frame shown in diagonal lines in FIG. 3. The term "guide block" refers to a member that cooperates with guide rails and/or defined guide paths for linear movement. The battery pack release member 100 can have an integral guide-block or be in communication with a guide block. However, the guide block can be implemented in other forms and may be used for other devices subject to a plurality (e.g., two) off-center loading.

Some embodiments of the invention are directed to devices with linear slides that have dual, off-center loads applied to the guide block. This may include linear slides used in triggers 11 (FIG. 1A), switches, shuttling mechanisms, etc. While embodiments of the invention are described herein for linear movement of a latch for a battery pack, the linear movement can be used for any component(s) which is subject to off center loading and frictional locking. Thus, the instant invention is applicable to any associated device that provides the guided linear movement.

The guide block 100b is pushed horizontally (in this illustration) towards the left using loading force "F", which, in turn, causes force reactions $R_1$, $R_2$ to occur at guide points 1 and 2, respectively. Force equilibrium in the vertical direction implies that $R_1=R_2=R$. Moment equilibrium about point 2 implies that $R \times w = F \times h$. For the frame 100f to move to the left, F must be able to exceed $\mu(R_1+R_2)=\mu(2R)=\mu(2Fh/w)$, where $\mu$ is the coefficient of friction. In a frictionless condition, $\mu=0$ and there are no horizontal reactions at points 1 and 2. The guideblock 100b slides easily when force is applied. However, for any non-zero value of $\mu$, there is a defined value of the ratio of h to w, above which the frame 100b will "friction lock" when F is applied. That is, if $h/w>1/(2\mu)$, then the reaction forces $R_1$, $R_2$ will be large enough so that $\mu$ times them is typically sufficient to undesirably arrest motion. Thus, to inhibit or prevent friction locking, the distance "h" should be limited.

Embodiments of the invention limit the distance "h" by the configuration of linear slides, which keep h appropriately small regardless of whether the applied force Fa comes from different locations, e.g., a user's hand (e.g., during delatching or activation) or from the tool/battery interface at relatching or release of a trigger and the like. Embodiments of the present invention differ from earlier known designs by allowing for linear movement, as opposed to rotational movement. Linear movement may be desired for certain applications as opposed to rotational movement.

Embodiments of the invention provide a non-binding linear slide design. The guide block includes a plurality of integrated or attached channels that cooperate with a plurality of spaced apart linear rails. In operation, if one or more off-center loads are applied to a guide block 100b, the guide block 100b will be guided by the nearest rail, which will allow for non-binding travel. At the location of each off-center load, the guide block 100b can be guided by the nearest rail 176 with associated contact points so that binding does not occur (if the guide block 100b is guided by a rail that is located away from the load a significant distance, binding may occur). The other rail may provide some support but the closer guide rail allows the primary linear movement guidance and more contact from the respective contact points. The non-guide rail may float and/or reside a distance in the respective guide path (e.g., channel) with less force or no contact on the corresponding contact points, while the other rail and corresponding guide path provides the linear movement guidance.

Figure 4C:
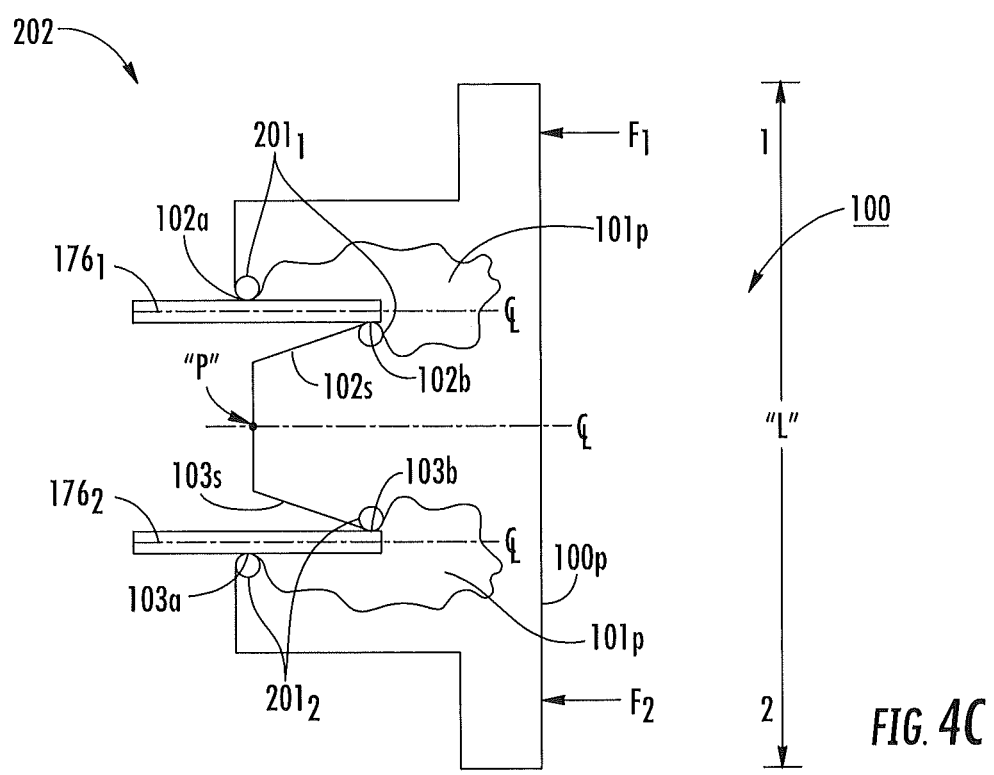
FIG. 4C is a schematic sectional view of a different linear slide configuration according to embodiments of the present invention.

FIG. 4A schematically illustrates a release member 100 that includes defined pathways 101p with respective contact points 102a, 102b and 103a, 103b. As shown in FIG. 4A, the pathways 101p may be defined by open ended channels $101_1$, $101_2$. FIG. 4C illustrates another embodiment of the pathways 101p. Where used, the channels $101_1$, $101_2$ can extend laterally inward as shown, where the release member 100 (or other guide block) is a side-push member (a user pushes inward in a lateral direction). In other embodiments, the release member 100 (or other guide block) is oriented at 90 degrees from that shown, with the outer surface 100p above the channels $101_1$, $101_2$ so that the channels $101_1$, $101_2$ extend downwardly into the battery pack housing or other housing.

As shown, the channels $101_1$, $101_2$ can have angled inner wall, or channel, segments 102s, 103s, respectively that create first and second spaced apart contact points, 102a and 102b and 103a and 103b, respectively, associated with how a force is applied to the external input surface. Thus, the release members 100 on the battery pack 17 can have two loading force positions (Force 1, Force 2, FIG. 4A). The first loading point Force 1 will be where the user presses the release member 100 (e.g., button(s)) to disengage the battery pack 17 (release the latch 105) from the tool 10 (Force 1). The second loading point Force 2 will be where the tool 10 presses the latch 105 to engage the battery pack 17 onto the tool 10 (Force 2).

In the embodiment shown in FIGS. 4A, 4B, 5A-5C, 6 and 7, the release member 100 is configured so that the latch 105 is integrated with the release member, e.g., it is a single piece 100u as shown in FIGS. 4B and 7, for example.

Referring to FIG. 4A, the two contact points 102a, 102b and 103a, 103b provided by each respective channel $101_1$, $101_2$, are laterally (as shown in the orientation of FIG. 4A) or longitudinally spaced apart (when the orientation is rotated 90 degrees) at a relatively significant distance from each other, each point is guided by the nearest channel $101_1$, $101_2$ and cooperating housing rail (track) $176_1$, $176_2$, but not guided by the other channel and housing rail, to inhibit binding. One of the contact points can reside at an outer end and at one side of an inner wall of each channel 102a, 103a.

Where used, the angled channel segments 102s, 103s can reside at a end portion of the channel or extend substantially the entire length of a respective channel $101_1$, $101_2$. The latter is illustrated in FIG. 4B for channel $101_2$. In some embodiments, at least a portion of the channels $101_1$, $101_2$ can angle toward each other along their length and/or at an outer end thereof as shown in FIGS. 4A, 4B. The channels $101_1$, $101_2$ can have a substantially constant width or may enlarge or narrow over their length. Each channel $101_1$, $101_2$ can have the same channel width, on average or at least a major portion of their respective length or one may be larger than the other. FIG. 4B illustrates that channel $101_2$ can have a larger cross-sectional width than channel $101_1$ and channel $101_1$ can be longer than channel $101_2$. The rail $176_1$ can be thinner and longer than rail $176_2$.

FIG. 4C illustrates that cooperating sets of spaced apart rigid pins 201 (e.g., dowel pins $201_1$, $201_2$) can define the respective contact points 102a, 102b and 103a, 103b for each pathway 101p. The pins 201 extend perpendicular to the figure in the view shown. The pins can have other shapes and may have different sizes. Additional numbers of pins may be used.

Although not shown, the guide block or release member 100b/100 can include more than two pathways 101p (each with a cooperating rail 176 in the housing). Further, in some embodiments, the rail and channel configurations can be reversed. That is, the release member 100 or guide block can include the rails instead of the channels or pathways and the housing can include the cooperating channels or pathways. Combinations of these two alternate configurations may also be used, e.g., the housing can include a spaced apart pathway and a rail and the release member 100 can include the other cooperating rail and pathway, respectively.

Referring to FIGS. 4A and 4B, the release member 100 (the combination button/latch piece and/or guide block) can be configured so that when the release member 100 slightly pivots about a centrally located return point "P" (FIG. 4A) residing between the first and second channels $101_1$, $101_2$. This pivot point P can define a spring return force point where a spring 202 is used (FIGS. 4B, 5A-5C).

Referring to FIGS. 4A and 4B, in use, as a user depresses the external portion of the release member 100 to delatch the battery pack 17, the contact points 103a, 103b of the opposite pathway 101p (e.g., channel $101_2$), the one away from the applied force "Force," move away from its corresponding rail $176_2$, while the contact points 102a, 102b of the nearest rail $176_1$ move towards the corresponding rail $176_1$ (e.g., track) thereby affirmatively engaging that guide path 101p (e.g., track). When the re-latch is pursued, the battery pack latch portion 105 engages the tool housing (15, FIGS. 5A, 5B) and the force "F" causes the pathway 101p (e.g., channel $101_1$) with channel points 103a, 103b to move towards rail $176_2$ while causing the contact points 102a, 102b to move away from rail $176_1$.

Figure 5B:
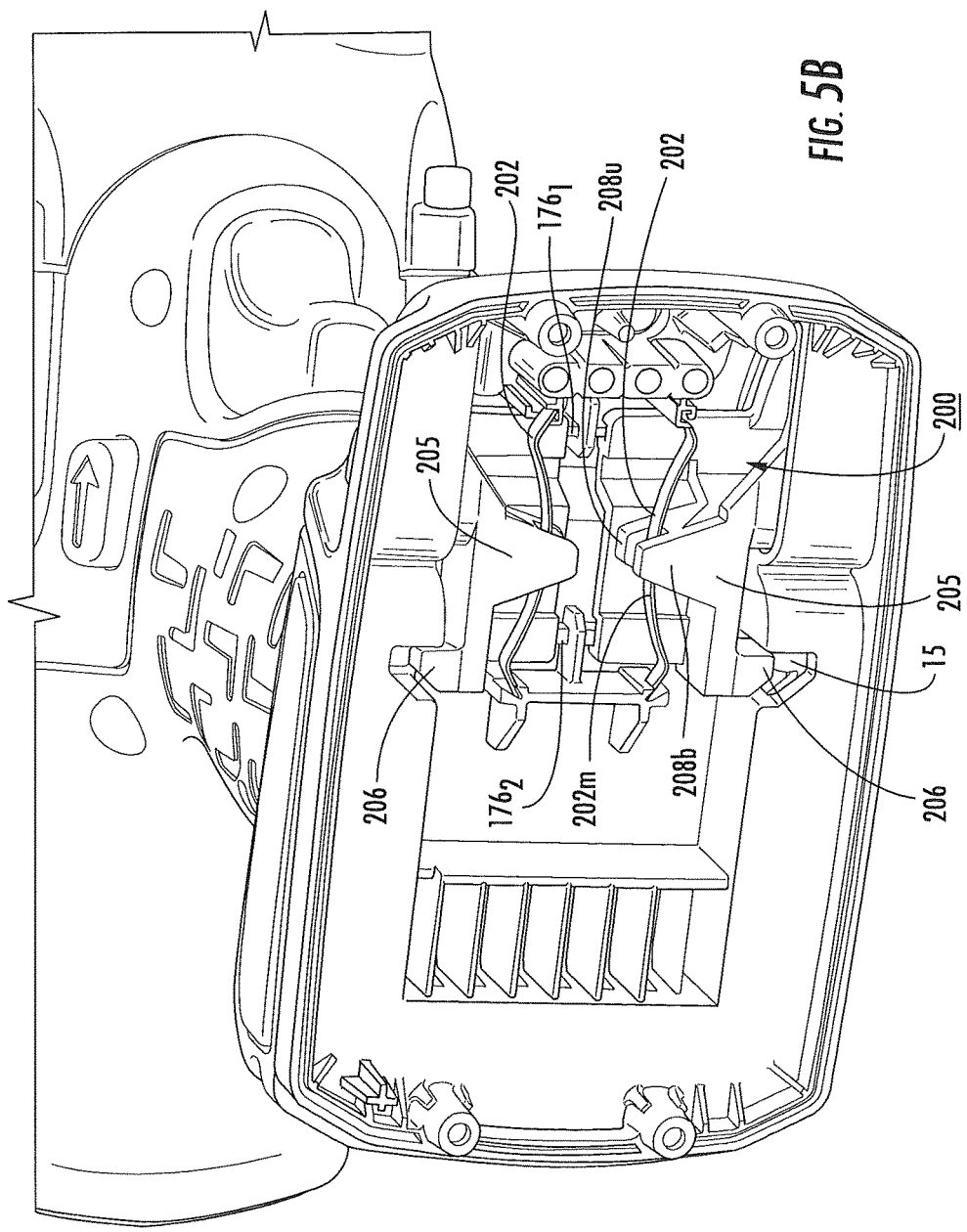
Figure 5C:
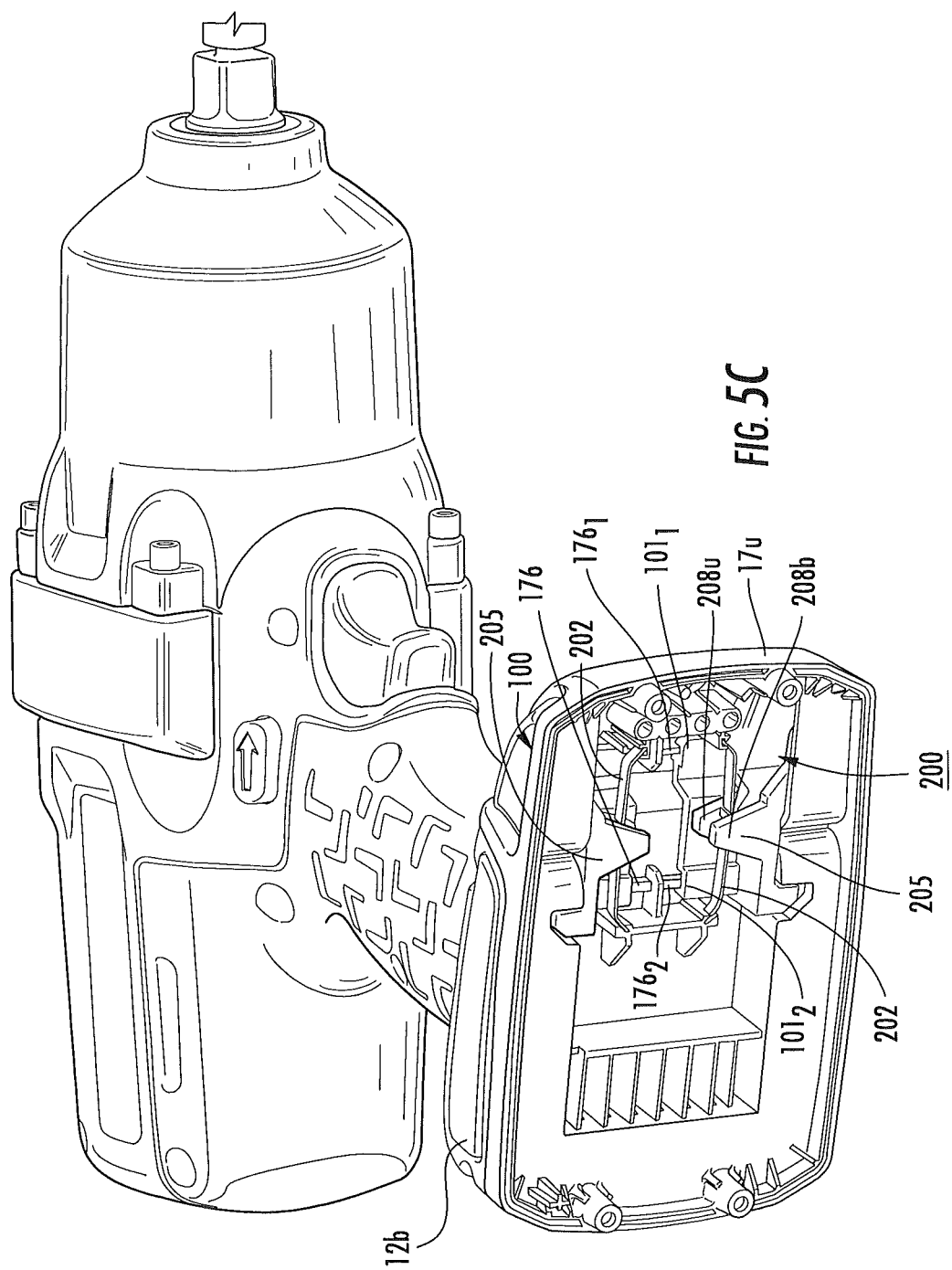

FIG. 6 illustrates that the rails $176_1$, $176_2$ can reside in an upper portion of the battery pack housing 17u and extend downwardly. The cooperating pathways 101p which are shown as optional channels $101_1$, $101_2$ can extend upwardly and substantially horizontally across the battery pack housing 17. However, other orientations can be used. FIGS. 5A-5C illustrate the underside of the channels $101_1$, $101_2$ and cooperating rails $176_1$, $176_2$. As there are two release members 100 in this embodiment, there are two pairs of spaced apart pathways and rails 101p and $176_1$ and 101p, $176_2$, one for each release member 100.

In some embodiments, such as shown in FIGS. 5A-5C, the tactile feedback mechanism 200 includes at least one buckle spring 202. As shown, two separate, spaced-apart buckle springs $202_1$, $202_2$ are used, one in communication with a respective one of the release members 100. However, in other embodiments one closed loop continuous buckle spring 202 can be used instead of the two shown and each side can be configured to communicate with a respective release member 100.

In the embodiment shown, a respective buckle spring 202 is held by a spring mounting member 205 that is connected to a respective release member 100. Optionally, the spring mounting member 205 can be formed as an integral part of the release member 100. Thus, as shown in FIG. 7, the release member 100 can have a complex molded unitary body with the spring mounting member 205 defining a bottom portion thereof and with the top portion defining the user accessible release member 100 (e.g., button).

FIGS. 6 and 7 also illustrate the battery cells 180 can be held in a unitary elastomeric (semi-rigid) carrier 181 with elongate channels 181c that hold the respective cells in a desired alignment and can provide vibration or shock insulation/resistance. Cell straps 183 can be used to electrically connect cells 180 as is known to those of skill in the art.

In the embodiment shown in FIGS. 5A-5C, the buckle spring 202 "buckles" when the release member 100 moves the spring mounting member 205 a distance "D" inward sufficient to depress the medial portion 202m of the spring to its buckling point (FIG. 5B), this movement is typically translation of between about 2-10 mm, typically about 5 mm. This distance "D" is defined to substantially correspond to when the release member 100 has been moved a distance sufficient to release the latch 105 from the housing 12. At the buckling point, a user will feel significantly less reaction force when depressing the release member 100, thereby indicating that the battery pack can be easily released from the power tool.

The spring mounting member 205 can have a leg portion 206 that slidably engages a channel 17c formed in an interior surface 17s of the upper housing body 17b. This interior surface 17s is typically a horizontal, substantially planar surface. As shown, there are two spaced apart rails $176_1$, $176_2$, one closer to the front of the upper housing 17b and the other longitudinally spaced apart proximate a rearmost portion of the release member 100. Each rail $176_1$, $176_2$ engages a respectively positioned one of two channels $101_1$, $101_2$ proximate the mounting member 205. The slot and leg configuration shown, for example in FIG. 4A, can be reversed so that the mounting member 205 can have a slot or channel 17c that slidably releasably engages a leg 206 on the housing 17u. Another way the mounting member(s) 205 can travel is by rotating about a pivot point, such that the spring actuation point still travels the desired distance "D", e.g., between about 2-10 mm, more typically about 5 mm, as opposed to linearly sliding on tracks 176.

As shown in FIGS. 5B and 6, the spring mounting members 205 can also include a medial portion with closely spaced upper and lower members 208u, 208b that hold the spring 202, oriented horizontally with its primary (flat) surfaces held vertically, therebetween. End portions of the spring or springs 202 can be attached to the housing inner surface using downwardly extending ribs 210 as shown in FIG. 5A. The attachment can be via frictional engagement, adhesive engagement, crimping, clamping or other suitable attachment means.

In some embodiments, an alternate way to achieve the buckling of the spring 205 (or spring washer or gasket as 230 will be discussed below) is to attach the spring to the release member so that the spring and release member move together. The spring 202 can react against a fixed point of the housing causing the tactile response (as opposed to moving a point on the release member (e.g., button moves, moving mounting members 205) into a stationary spring.

FIGS. 6 and 7 illustrate that the battery pack 17 can include a plurality of battery cells 180 held under a circuit board 188 inside the housing. The tactile feedback mechanism 200 can reside above the cells 180 and the circuit board 188. The linear rails $176_1$, $176_2$ and channels $101_1$, $101_2$ can reside above the circuit board 188.

In some embodiments, in operation, as a user depresses the release members 100, the application force pushes the spring mounting members 205 closer together, slidably translating a portion of the legs 206 inward from respective channels 17c, guided by rails 176. In reverse, when the battery is inserted into the tool, the tool portion 15 presses on legs 206. This is similar to how the user's fingers press the release members (e.g., buttons) 100, except the portion 15 presses on opposite side of the spring center point, compared to the user pressing members 100. This action of the tool portion 15 pressing the legs 206 also creates a tactile action of the tactile feedback mechanism(s), e.g., spring, although the user most likely does not feel the tactile since they are holding the battery housing. This action of the tool portion 15 pressing member(s) 100 may still provide an audible response though, which may provide a positive acknowledgement to the user that the battery is fully engaged in the tool housing. Thus, the tactile feedback mechanism 200 can be configured to provide a tactile feedback at release/de-latching and an audible "click" feedback at proper battery engagement (lock).

In some embodiments, the buckle spring 202 can self-restore to its pre-load shape shown in FIG. 4A when the spring mounting member 205 removes the de-latch application force (FIG. 4C) without requiring a return bias spring or force-return member.

FIG. 8 illustrates an example of a shaped pre-formed buckle spring 202 that may be particularly suitable to provide a "snap-action" tactile feedback according to embodiments of the present invention. This curvilinear spring buckle 202 can be attached to the spring mounting member 205 in a pre-load configuration to move the medial peak portion of the spring inward to be substantially straight/ and or in-line with the ends thereof as shown in FIG. 5A. This shape can define biased stress to provide the self-restoring configuration noted above. However, other buckle spring shapes can be used to provide the desired tactile feedback. See e.g., U.S. Pat. Nos. 2,501,497, 3,366,756, and 5,268,545, the contents of which are hereby incorporated by reference as if recited in full herein.

FIG. 9A illustrates another embodiment of a tactile feedback mechanism 200. The tactile feedback mechanism 200 employs magnetic attraction to facilitate the tactile response. As shown, this assembly 200 includes at least one magnet 215, typically a permanent magnet such as a ferromagnetic (e.g., ferrite or rare earth) magnet along with another member 218 that generate a magnetic attraction or repel force Fa, Fb (FIGS. 9B, 9C) as the members 215, 218 move closer together or farther apart. or a material that moves or changes viscosity in response to exposure to a magnetic field. One of the members, e.g., member 218 can be a permanent or electromagnet or a member that comprises magnetorheological fluid (also known as an MR fluid, available from Lord Corporation) or a ferrofluid. The fluids change viscosity when subjected to a magnetic field. The at least one magnet 215 and/or 218 may also be an electromagnet, e.g., a wire coil that can conduct current. The current can be provided from a connection to the printed circuit board 188 (FIG. 6) to be powered by the battery in the battery pack 17.

In the embodiment shown, user depression of the release member 100 (or 100'), causes the magnet 215 and other cooperating member 218 to travel closer together. As shown in FIG. 9A, when the two members 215, 218 are in close proximity and/or contact, the attraction force Fa of the members 215, 218 reduces the application force and provides a tactile feedback similar to a "snap" action feel. The magnet 215 and other member 218 can be reversed. FIG. 9A illustrates the spring mounting members 205 described above replaced by holders 225 and the buckle spring 202 replaced by members 215, 218 (either or both of which can be a magnet, ferromagnetic material, or comprise a material that increases in viscosity when exposed to a magnetic field as discussed above).

In some embodiments, each member 215, 218 comprises a permanent magnet 215*m*, 218*m*. FIG. 9B illustrates that the members 215*m*, 218*m* can be configured to repel each other when positioned close together, while FIG. 9C illustrates that the magnets 215, 218 can be configured to generate an attraction force. In either case, the magnets 215*m*, 218*m* will provide a substantial change in force needed to move the release member 100 when the members 215, 218 are close together. As shown, the members 215, 218 translate to be closer together. In other embodiments, the members 215, 218 can "snap" further apart when the application force overcomes the attraction force, to provide a reduced reaction force that generates the tactile feedback response (not shown).

Figure 10A:
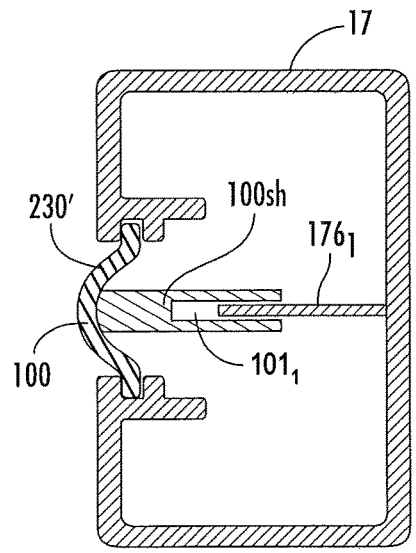
FIGS. 10A and 10B are schematic illustrations of a battery pack with an external dome (spring) gasket that is in communication with linear slides according to embodiments of the present invention.
Figure 10C:
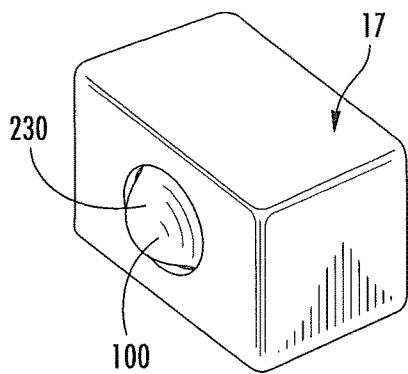
FIG. 10C is a side perspective view of the devices shown in FIGS. 10A and 10B, according to embodiments of the present invention.
Figure 10B:
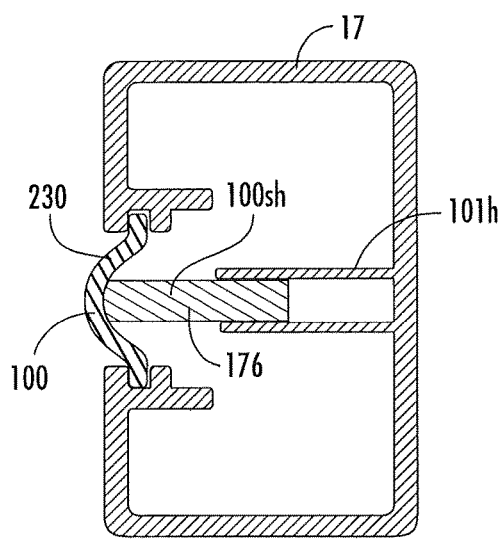

FIG. 10A illustrates the use of a release member shaft 100*sh* that can form the channels 101$_1$, 101$_2$ that cooperate with a respective linear rail 176 under an elastomeric (e.g., rubber) dome washer(s)/gasket 230 that can be attached to the housing 17 and can generate a tactile response. In this view, the second channel 101$_2$ is directly behind (into the paper) the first channel 101$_1$ and is occluded in this view. FIG. 10B illustrates that the shaft 10*sh* can define the cooperating rail 176 instead of the channel(s) 101$_1$, 101$_2$, which can instead be formed or held by another component in alignment in the housing. FIG. 10C illustrates that the protruding dome gasket 230 can be attached, typically sealably attached, to the housing and be externally accessible for contact by a user.

Figure 11:
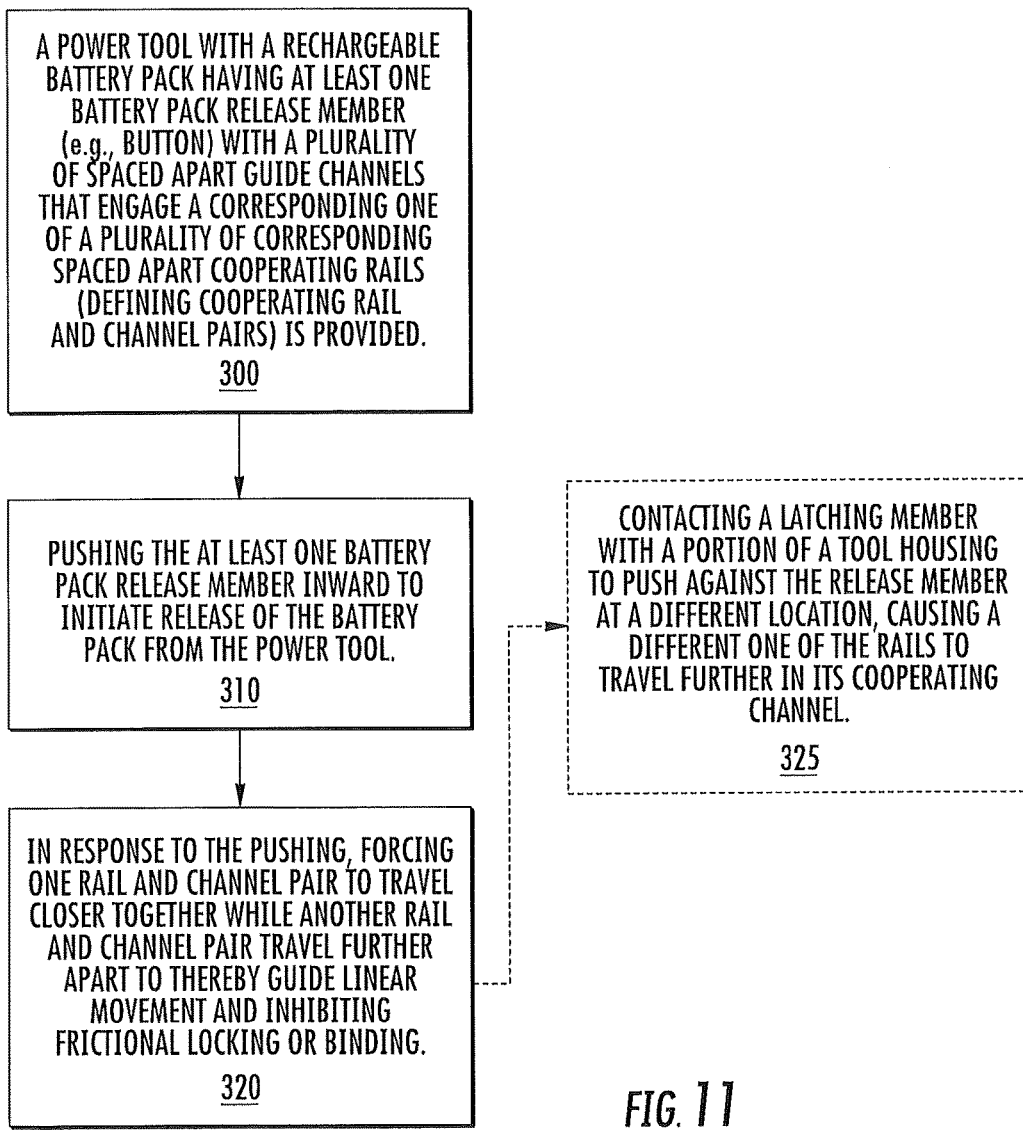
FIG. 11 is a flow chart of exemplary operations that can be used to de-latch a battery pack from a housing according to embodiments of the present invention.

FIG. 11 is a flow chart of exemplary operations that can be carried out to release a battery pack from a tool. A power tool with a rechargeable battery pack having at least one battery pack release member (e.g., button) with a plurality of spaced apart channels that engage a corresponding one of a plurality of corresponding spaced apart cooperating rails is provided (block 300). The at least one battery pack release member is manually actuated (e.g., depressed or pushed) inward to initiate release of the battery pack from the power tool (block 310). In response to the pushing, forcing one rail to travel further in its cooperating channel than the other rail to guide the linear actuation movement while the other rail and channel travel away from a cooperating rail to thereby inhibit frictional binding (block 320).

The method may also include latching the battery pack by (sliding a power tool housing onto a contact surface of the battery pack then) contacting a latching member with a portion of a tool housing to push against the release member at a different location, causing a different one of the rails to travel further in its cooperating channel (block 325).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, if used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A rechargeable battery pack, comprising:
   a battery pack housing body;
   first and second spaced apart linear rails positioned within an interior of the battery pack housing body and extending from an interior surface thereof;
   a battery pack release member in slidable communication with the battery pack housing body;
   first and second defined channels in the battery pack release member, the first and second defined channels being configured to receive therein the first and second linear rails, respectively, as the battery pack release member slidably translates further into the interior of the battery pack housing body in response to an inwardly applied force to the battery pack release member;

first and second spaced apart contact points in each of the first and second defined channels, wherein the force applied outside an area between the first and second defined channels at either a first end portion or a second end portion of the battery pack release member generates an off-center load thereon, wherein, the off-center load pivots the battery pack release member about a pivot point positioned in the area between the first and second defined channels to cause the first and second spaced apart contact points of the first or second defined channel closest to the off-center load to physically contact the respective linear rail to provide primary linear movement guidance to the slidable translation of the battery pack release member with respect to the battery pack housing body, while the off-center load causes the first and second spaced apart contact points of the first or second defined channels furthest from the off-center load to move away from the respect linear rail, wherein the first contact point of the first defined channel resides proximate an end point of a side of the first defined channel and the second contact point of the first defined channel resides along an opposing side of the first defined channel, and wherein the first contact point of the second defined channel resides proximate an end point of a side of the second defined channel and the second contact point of the second defined channel resides along an opposing side of the second defined channel;

further comprising a first angled wall segment in the first defined channel, the first angled wall segment being positioned in the opposing side of the first defined channel and from an end point of the opposing side to the second contact point, the first angled wall segment being angled with respect to a remaining portion of the opposing side.

2. The device of claim 1, wherein the first and second defined channels include angled wall segments configured so that a force applied at:

(i) the first end portion causes the first rail to engage the first channel contact points while the second rail has less or no contact with the second channel contact points; and (ii) the second end portion causes the second rail to engage the second channel contact points while the first rail has less or no contact with the first channel contact points, and wherein only the first and second contact points of either the first or second channel guides linear movement for the force applied at respective first and second end portions.

3. The device of claim 1, wherein the battery pack release member includes or is in communication with a latching member, and wherein the first and second rails are substantially parallel rails.

4. The device of claim 1, wherein the battery pack release member has a body that defines the first and second channels, and wherein the channels reside on opposing sides of a center line of the battery pack release member that extends in a direction of travel of the battery pack release member.

5. The device of claim 3, wherein the rails extend downwardly from an upper portion of the battery pack housing body, and wherein the battery pack release member includes a portion that resides under the rails and defines the first and second channels with the first and second channels extending upwardly with respective open ends thereof facing upward.

6. The device of claim 3, wherein the battery pack release member comprises a primary body with an upper portion and a lower portion, the upper portion of the primary body residing outside the battery pack housing body to define a user accessible manually actuatable contact point, including the first and second contact portions, and wherein the lower portion of the primary body resides inside the battery pack housing and includes the first and second defined channels.

7. The device of claim 6, wherein the primary body includes an upwardly extending latch portion that extends above and is substantially in-line with the second channel.

8. The device of claim 5, wherein the first and second channels are upwardly extending channels, and wherein the battery pack housing has an upper portion that defines the rails, with the first and second rails laterally extending across an inner portion of the upper portion of the battery pack housing body.

9. The device of claim 2, wherein the first channel is longer and thinner than the second channel.

10. The device of claim 2, wherein the battery pack release member has a lower portion held inside the battery pack housing and an upper portion being externally accessible for manual actuation by a user, wherein the first off center force position that moves the first rail and channel closer together is associated with a delatch actuation force applied to the battery pack release member by a user and the second off center force position is associated with a latch force applied by the housing in response to contact with a latch member.

11. The device of claim 1, wherein the first and second channels comprise rigid first and second sets of pins as the spaced apart contact points, each set of pins comprising a first pin on a first side of a centerline of a gap space and a second pin positioned on a second side of the centerline and being spaced apart from the first pin that define the contact points.

12. The device of claim 1, wherein under the force applied at the first end portion, a contact force between the first linear rail and the first and second spaced apart contact points of the defined channel of the first linear rail is greater than a contact force between the second linear rail and the first and second spaced apart contact points of the defined channel of the second linear rail.

13. The device of claim 1, wherein under the force applied at the second end portion, a contact force between the second linear rail and the first and second spaced apart contact points of the defined channel of the second linear rail is greater than a contact force between the first linear rail and the first and second spaced apart contact points of the defined channel of the first linear rail.

14. The device of claim 1, wherein the first and second spaced apart linear rails are spaced apart in a first direction, and wherein the first and second spaced apart contact points of either the first or second defined channels are spaced apart in a second direction substantially perpendicular to the first direction.

15. The device of claim 1, further comprising a second angled wall segment in the second defined channel, the second angled wall segment being positioned in the opposing side of the second defined channel and from an end point of the opposing side to the second contact point, the second angled wall segment being angled with respect to a remaining portion of the opposing side.

* * * * *